United States Patent
Schmidt

(10) Patent No.: US 10,166,992 B2
(45) Date of Patent: Jan. 1, 2019

(54) IMPAIRMENT EVALUATION SYSTEM

(71) Applicant: Toyota Motor Engineering & Manufacturing North America, Inc., Erlanger, KY (US)

(72) Inventor: Eric Randell Schmidt, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 179 days.

(21) Appl. No.: 14/720,026

(22) Filed: May 22, 2015

(65) Prior Publication Data

US 2016/0339922 A1    Nov. 24, 2016

(51) Int. Cl.
*B60W 40/08* (2012.01)

(52) U.S. Cl.
CPC ..... *B60W 40/08* (2013.01); *B60W 2040/0836* (2013.01)

(58) Field of Classification Search
CPC ................ B60W 40/08; B60W 2040/0836
See application file for complete search history.

(56) References Cited

U.S. PATENT DOCUMENTS

| | | | |
|---|---|---|---|
| 6,974,326 B2 | 12/2005 | Marple-Horvat | |
| 7,236,094 B2 | 6/2007 | Jones | |
| 7,652,583 B2 | 1/2010 | Sanchez et al. | |
| 7,671,752 B2 | 3/2010 | Sofer | |
| 8,049,631 B1 | 11/2011 | Edwards | |
| 8,089,364 B2 | 1/2012 | Sofer | |
| 8,928,470 B2 * | 1/2015 | Morgan | B60K 28/063 340/426.1 |
| 2004/0083031 A1 | 4/2004 | Okezie | |
| 2006/0212195 A1 | 9/2006 | Veith et al. | |
| 2007/0024454 A1 | 2/2007 | Singhal | |
| 2010/0010689 A1 | 1/2010 | Yasushi et al. | |
| 2012/0206252 A1 * | 8/2012 | Sherony | B60W 30/12 340/438 |
| 2013/0335213 A1 * | 12/2013 | Sherony et al. | G08G 1/167 340/439 |

* cited by examiner

*Primary Examiner* — Ryan Sherwin
(74) *Attorney, Agent, or Firm* — Dinsmore & Shohl LLP

(57) ABSTRACT

A system configured to administer an impairment evaluation when a driver has been identified as attending an impairment event is provided. The system includes a driver profile unit configured to determine a sober driver profile. A sensor unit detects the location and operation of the motor vehicle after a motor vehicle stop. An impairment event unit receives the information regarding the operation of the vehicle from the sensor unit and compares the operation of the vehicle with the sober driver profile after the motor vehicle stop. The drinking unit identifying the motor vehicle stop as an impairment event when the operation of the vehicle deviates from the sober driver profile a predetermined amount. A challenge is administered to the driver after the impairment event so as to determine if the driver is impaired. The vehicle is rendered inoperable when the driver fails the challenge.

13 Claims, 3 Drawing Sheets

IMPAIRMENT EVALUATION SYSTEM

TECHNICAL FIELD

A system configured to administer an impairment evaluation when the driver has been identified as attending an impairment event is provided.

BACKGROUND OF THE INVENTION

Systems for preventing the operation of a vehicle by an impaired driver are currently known and used. Such systems administer a test configured to determine the impairment of the driver. However, such tests rely upon relatively rigid conditions to initiate a test.

For example, some vehicles are equipped with a breathalyzer which requires the driver to blow into the breathalyzer before the vehicle is enabled. In another example, a test is administered when the vehicle is parked next to a drinking establishment during a certain period of time, or on a certain holiday. However, such conditions may be inapplicable to the driver. For instance, if the driver parks the vehicle at a parking lot shared by both a drinking establishment and a shopping mall, a test will be administered even if the driver doesn't drink and instead goes into the shopping mall. Accordingly, it remains desirable to have a system which administers a test based upon the driving habits of the user so as to avoid inappropriate administration of a test.

SUMMARY OF THE INVENTION

A system configured to prevent an impaired driver from operating a motor vehicle is provided. The system includes a driver profile unit configured to generate a sober driver profile. The sober driver profile is the operating characteristics of the vehicle operated by a sober driver. The system includes a sensor unit to detect the location and operation of the motor vehicle after a motor vehicle stop.

The system further includes an impairment event unit and a challenge unit. The impairment event unit compares the operation of the vehicle with the sober driver profile after the motor vehicle stop. The drinking unit identifies the motor vehicle stop as an impairment event when the operation of the vehicle deviates from the sober driver profile a predetermined amount.

The challenge unit administers the challenge to the driver. In particular, the challenge is administered after the next occurrence of the impairment event so as to determine if the driver is impaired. The challenge unit renders the vehicle inoperable when the driver fails the challenge. Accordingly, the system is configured to learn of events in which the driver may have been drinking and issues the challenge only after such impairment events so as to avoid a rigid system which imposes challenges when the probability that the driver has been drinking is low.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

A system configured to prevent an impaired driver from operating a motor vehicle is provided. The system issues a challenge for the driver after an impairment event, wherein the vehicle is rendered inoperable if the driver fails the challenge. The system includes a driver profile unit configured to generate a sober driver profile. A sensor unit detects the location and operation of the motor vehicle after a motor vehicle stop.

The system further includes an impairment event unit. The impairment event unit compares the operation of the vehicle with the sober driver profile after the motor vehicle stop. The impairment event unit identifies the motor vehicle stop as an impairment event when the operation of the vehicle deviates a predetermined amount from the sober driver profile. Accordingly, an impairment event, as used herein, relates to an event which impairs the driver's ability to operate the vehicle. Factors which the impairment event unit may consider include the braking profile, turning profile, traffic speed, acceleration, and lane departure. The impairment may be a result of alcohol or drug consumption.

A challenge unit administers the challenge to the driver. In particular, the challenge is administered after the next occurrence of the impairment event so as to determine if the driver is impaired. The challenge unit renders the vehicle inoperable when the driver fails the challenge. Accordingly, the system is configured to learn of events in which the driver may have been drinking and issues the challenge only after such impairment events so as to avoid a rigid system which imposes challenges when the probability that the driver has been drinking is low.

Figure 1:
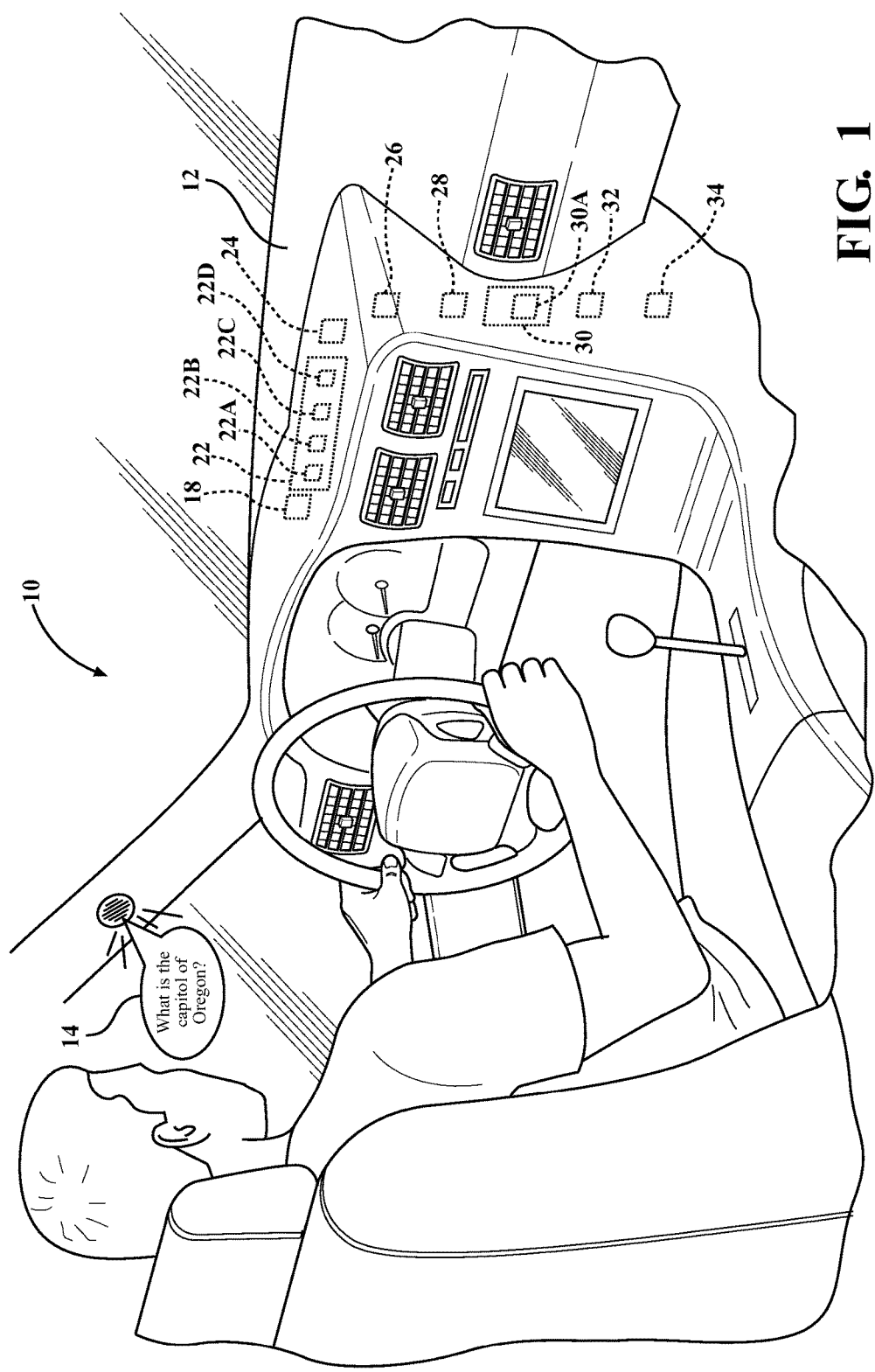
FIG. 1 is a perspective view of the vehicle having the system.
Figure 2:
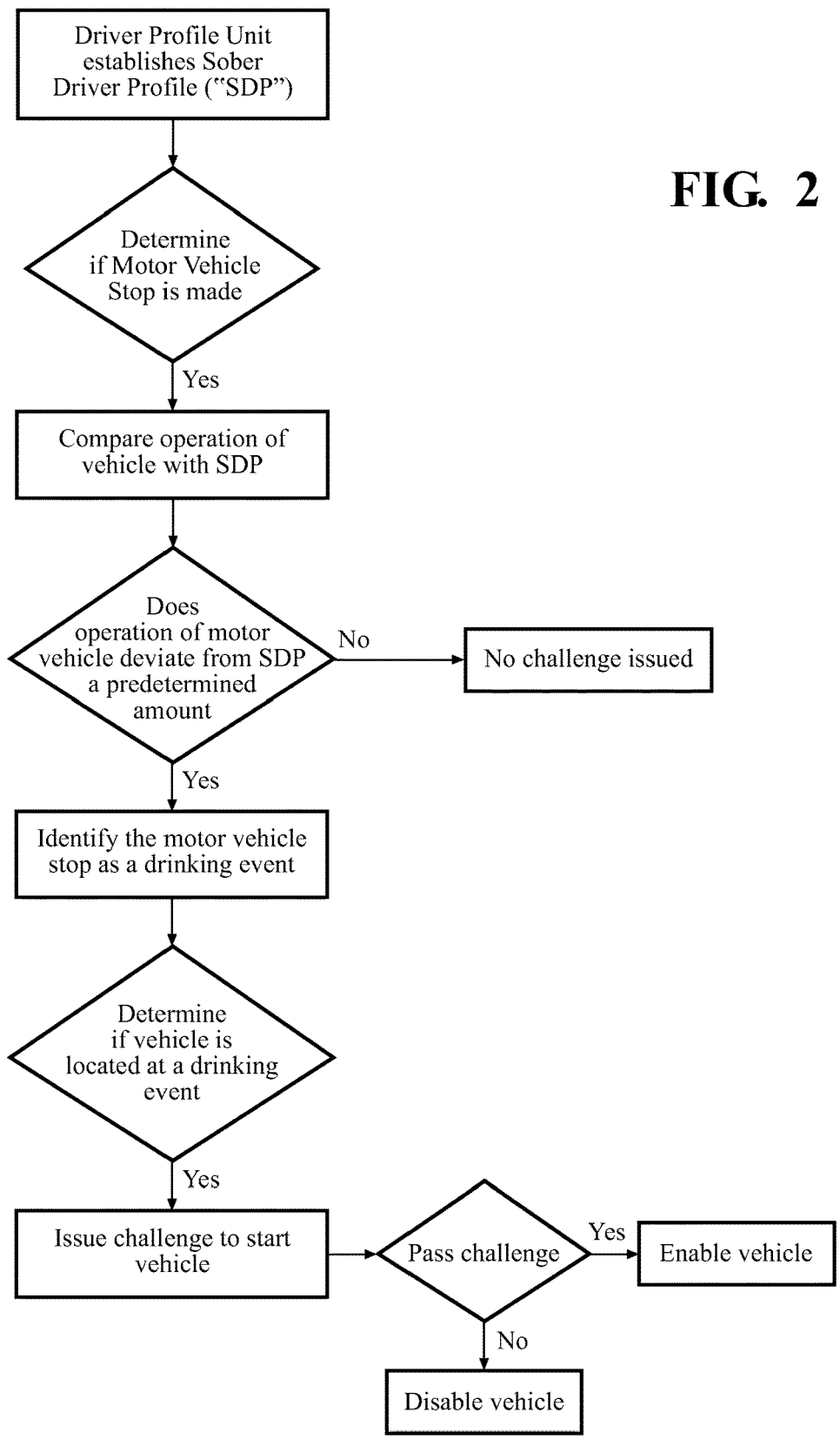
FIG. 2 is a diagram showing the operation of the system.

With reference now to FIGS. 1 and 2, a system 10 configured to prevent an impaired driver from operating a motor vehicle 12 is provided. The system 10 is implemented in a motor vehicle 12. The system 10 is configured to prevent an impaired driver from operating the motor vehicle 12 by administering a challenge 14 after the driver has attended an impairment event 16.

The system 10 includes a driver profile unit 18 configured to determine a sober driver profile 20. The driver profile unit 18 receives information from the motor vehicle 12 to determine the driver's driving habits with respect to the operation of the motor vehicle 12. The driver profile unit 18 is further configured to using driving habits taken when the probability of the driver being sober is high.

For instance, the driver profile unit 18 may record and process the driving operation of the motor vehicle 12 on weekday mornings when the driver is driving to work. The driving habits may include how much force the driver applies to the brakes, if the driver follows the speed limit, how sharp the driver takes a turn and the like. It should be appreciated that the sober driver profile 20 is determined after a predetermined sampling size. For example, the system 10 may be configured to determine a sober driver profile 20 after 40 hours of driving time.

The system 10 includes a sensor unit 22 configured to detect the location and operation of the motor vehicle 12. The sensor unit 22 provides information relating to the operation of the motor vehicle 12 to the driver profile unit 18 at times demanded by the driver profile unit 18 so as to establish the sober driver profile 20. For instance, the sensor unit 22 may include a speedometer 22*a*, an accelerometer 22*b*, a steering wheel angle sensor 22*c* and a brake pad sensor 22*d* configured to detect speed, turning and braking force of the motor vehicle. The sensor unit 22 may be configured to detect the braking, turning, speed, acceleration and lane departure. Such information is processed by the driver profile unit 18 to determine the sober driver profile 20. For example, a sober driver profile 20 may show that the driver tends to apply the brake with a certain force, or tends to accelerate at a certain rate after each traffic stop, or tends to follow the speed limit.

The sensor unit 22 may be further configured to monitor and detect the operational characteristics of the motor vehicle 12 after a "motor vehicle stop." As used herein, a motor vehicle stop refers to when the motor vehicle 12 has stopped operating after the motor vehicle 12 has traveled a predetermined distance, and has remained inactive for a predetermined period of time with the ignition switch off. Accordingly, a determination of impairment is not made after events such as filling the gas tank, going through a drive-through, stopping at a traffic light and the like.

The system 10 further includes an impairment event unit 24. The impairment event unit 24 may be an executable software program written onto an engine control unit 26 of the motor vehicle 12. The impairment event unit 24 is configured to receive information from the sensor unit 22. The impairment event unit 24 receives information relating to the operation of the motor vehicle 12 from the sensor unit 22. The impairment event unit 24 compares the operation of the motor vehicle 12 with the sober driver profile 20 after a motor vehicle stop has been determined. The impairment event unit 24 identifies the motor vehicle stop as an impairment event 16 when the operation of the motor vehicle 12 deviates from the sober driver profile 20 a predetermined amount.

It should be appreciated that the impairment event unit 24 makes a comparison after the sober driver profile 20 is established and a motor vehicle stop is detected. For instance, an impairment event 16 may be determined because the driver has applied the brakes with greater force than the braking characteristics of the sober driver profile 20, or accelerates less rapidly than the acceleration characteristics of the sober driver profile 20, or is not following the speed limit unlike the sober driver profile 20. It should be appreciated that these factors may be weighted and a determination of an impairment event 16 may be made based upon the deviation of from the sober driver profile 20 of one or more factors.

The system 10 may store multiple impairment events 16. The impairment event 16 may include the time, date and location of the motor vehicle stop. The sensor unit 22 monitors the location of the motor vehicle 12 and identifies and may associate the location of the stopped motor vehicle 12 with a corresponding impairment event 16.

The system 10 further includes a challenge unit 28. The challenge unit 28 may be an executable software program written onto the engine control unit 26 of the motor vehicle 12. The challenge unit 28 is configured to issue a challenge 14 to the driver after the impairment event 16 has been identified. The challenge 14 is configured to determine if the driver is impaired. The challenge unit 28 is further configured to render the motor vehicle 12 inoperable when the driver fails the challenge 14.

Figure 3:
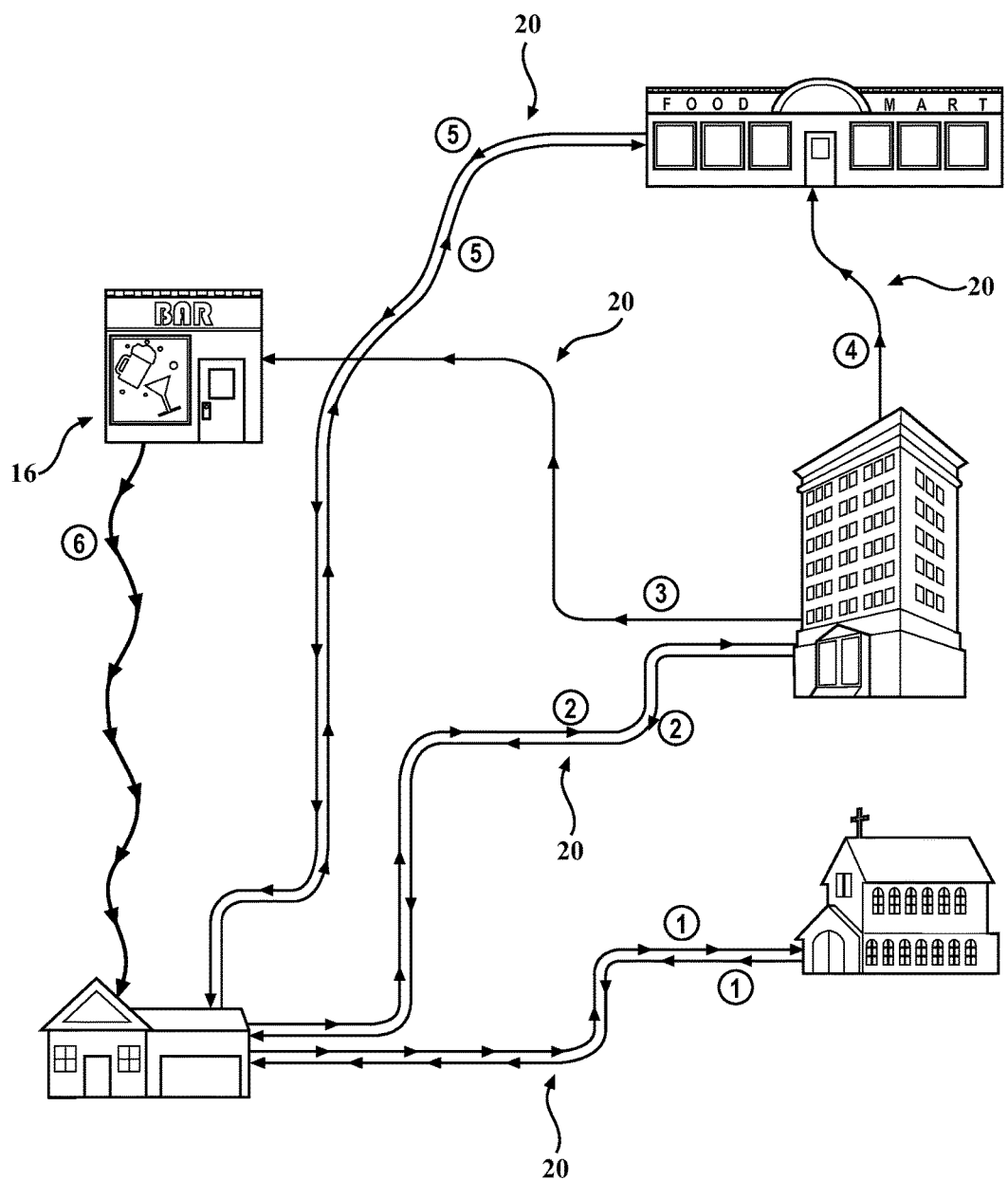
FIG. 3 view of a map showing the stopping routine of the driver.

With reference now to FIG. 3, the operation of the system 10 is provided. FIG. 3 shows a routine detected by the driver profile unit 18. In particular, lines 1 represents a path of travel to and from church. Lines 2 represents the path of travel to and from the driver's work. Line 4 shows the motor vehicle leaving work to go to the supermarket. Line 3 shows the motor vehicle 12 leaving work to go to a drinking establishment. Lines 5 show a path of travel to and from the supermarket. Line 6 shows a path of travel from the drinking establishment to the driver's home.

As the motor vehicle 12 identifies these patterns of travel described above, the motor vehicle may associate a particular path of travel as being suitable to establish a sober driver profile 20. As shown in FIG. 2, the system 10 associates the path of travel along lines 1-5 as being appropriate to determine a sober driver profile. The determination may be made based upon the time of day the path of travel is made. For instance, the driver profile unit 18 may be programmed to record the operation of the motor vehicle during weekdays from 7 am to 9 am, when the driver is heading to work, and 5 pm to 7 pm, when the driver is leaving work. The driver profile unit 18 may also record the operation of the motor vehicle 12 on weekends, such as Sunday morning upon associating a motor vehicle stop as stopping at a church. The sensor unit 22 provides information to the driver profile unit, to include braking, steering, acceleration and speed. The driver profile unit 18 may compare the information with map information obtained by a global positioning system so as to determine a sober driver profile 20. It should be appreciated that the sober driver profile may be updated based upon subsequent operating characteristics of the motor vehicle 12.

The sensor unit 22 provides the impairment event unit 24 with the location of the motor vehicle 12 after a motor vehicle stop is made. The impairment event unit 24 processes the stored impairment events 16 to determine if the location of the motor vehicle 12 is associated with any one of the impairment events 16. In the event an impairment event 16 is associated with the motor vehicle 12 location, the challenge unit 28 administers a challenge 14 when the driver tries to start the motor vehicle 12. If the driver fails the challenge 14, the challenge unit 28 renders the motor vehicle 12 inoperable.

For example, the sensor unit 22 detects the driving characteristics along Line 6, which is prompted by the motor vehicle stop. In this instance, the driver leaves the motor vehicle 12 to enter the bar for a predetermined period of time, such as an hour. When the motor vehicle 12 is started to begin travel, the sensor unit transmits the characteristics of operation of the motor vehicle 12 to the impairment event unit 24. The impairment event unit 24 compares the operation of the motor vehicle 12 with the sober driver profile. Assuming that the operation of the motor vehicle 12 along Line 6 deviates a predetermined amount from the sober driver profile 20, a motor vehicle stop at the bar is then associated as an impairment event 16.

With respect to driver's place of work, the driver profile unit may be programmed to assume that the driver's place of work is not an impairment event 16. This may be done by a manual entry of the driver. However, as the motor vehicle is stopped for a predetermined amount of time when the driver is working, the system detects a motor vehicle stop and subsequent travel along lines 2, 3 or 4 prompt the sensor unit 22 to detect the driving characteristics. The sensor unit 22 transmits the characteristics of operation of the motor vehicle 12 to the impairment event unit 24. The impairment event unit 24 compares the operation of the motor vehicle 12 with the sober driver profile. Assuming that the driving characteristics does not deviate from the sober driver profile 20, a motor vehicle stop at the place of work is not associated as an impairment event 16.

With respect to the supermarket, subsequent travel along line 5 prompt the sensor unit 22 to detect the driving characteristics. The sensor unit 22 transmits the characteristics of operation of the motor vehicle 12 to the impairment event unit 24. The impairment event unit 24 compares the operation of the motor vehicle 12 with the sober driver profile. The supermarket may be identified as an impairment event 16 in instances where the operation of the motor vehicle 12 deviates a predetermined amount from the sober driver profile 20. This may be helpful in places where the supermarket shares a parking lot with a drinking establishment.

The system 10 may further include a calendar unit 30. The calendar unit 30 includes a calendar 30a and is configured to identify holidays and the birthdays. For instance, the calendar unit 30 includes a list of dates 32 which are associated with drinking, such as New Year's Eve, St. Patrick's Day and Cinco de Mayo. The calendar unit 30 may be configured to be programmable, wherein the driver's birthday may be uploaded into the calendar. The impairment event unit 24 compares the operation of the motor vehicle 12 with the sober driver profile 20 on each holiday and birthday so as to determine if the respective holiday or birthday is an impairment event 16.

For instance, the impairment event unit 24 processes the calendar 30a to determine if the day is a date on the list of dates that are associated with drinking. In one mode of operation, the impairment event unit 24 automatically identifies a holiday or birthday as an impairment event 16, and thus a challenge 14 is administered. The system 10 may be further configured to store how many challenges 14 were passed on a holiday or birthday identified as an impairment event 16. In instances, where the driver passes the challenge 14 a predetermined number of times, the impairment event unit 24 identifies the holiday or birthday as a non-impairment event. For instance, the impairment event unit 24 may identify a birthday after the driver passes a challenge 14 issued on three consecutive birthdays. Accordingly, the impairment event unit 24 is further configured to determine the impairment event 16 is a non-impairment event when the driver passes the challenge 14 a predetermined period of time.

In another mode of operation, the impairment event unit 24 does not automatically associate any of the holidays or birthdays as being an impairment event 16. The impairment event 16 receives information relating to the operation of the motor vehicle 12 from the sensor unit 22 after a motor vehicle stop on a holiday or birthday and automatically compares the operation of the motor vehicle 12 with the sober driver profile 20 to determine if the holiday or birthday is an impairment event 16. In such a manner, the challenge unit 28 administers a challenge 14 before the operation of the motor vehicle 12 is allowed on subsequent holidays or birthdays identified as impairment events 16.

The system 10 may further include a time unit 34. The time unit 34 is configured to provide the time of day. The challenge unit 28 may be configured to administer only during a predetermined period of time, such as after working hours. Accordingly, in instances where the motor vehicle 12 is being operated on a holiday which is associated as an impairment event 16, a challenge 14 will not be administered in the morning, but will be administered after working hours. The driver profile unit 18 may also process the time unit 34 so as to generate the sober driver profile 20 using the operation of the motor vehicle 12 taken during times in which drinking is improbable, such as in the middle of a work day or in the morning of a weekday.

As described above, the sober driver profile 20 may be generated by taking into account the braking habits, speed and turning characteristics of the driver. Such information may be provided by sensors currently known and used in motor vehicles 12. Such components are used in current motor vehicle 12 adaptive brake systems, automatic cruise control with adaptive following capabilities, or lane detection systems. For instance, the sensor unit 22 may a speedometer for determining the speed of the motor vehicle 12, a steering wheel angle sensor to detect a turn, and a brake pad sensor configured detect the braking force of the motor vehicle 12. The current speed of the motor vehicle 12 may be compared with the posted speed limit so as to determine if the driver tends to speed, adheres to the speed limit, or drives below the speed limit. The posted speed limit may up download to the motor vehicle 12 or provided by an internally stored database The impairment event unit 24 is further configured to associate the stopping event with the location of the motor vehicle 12, the time and day of the stopping event, the duration of the stopping event, and the occurrence of the stopping event so as to determine a stopping routine. As used herein, a stopping routine refers to a pattern or habitual stop made by the motor vehicle 12. For instance, the impairment event 16 may detect that the motor vehicle 12 stops at a bowling alley every Wednesday between 6:30 to 11:00 pm, goes to church every Sunday from 10:00 am to 12:00 pm or goes to a park every Thursday from 5:30 to 7:00. The driver profile unit 18 may be further configured to generate a plurality of driver profiles for each of the stops in the stopping routine. In such an embodiment, the impairment event unit 24 compares the operation of the motor vehicle 12 with the sober driver profile 20 corresponding to stop in the stopping routine. The impairment event unit 24 identifies the associated stop in the stopping routine as an impairment event 16 when the operation of the motor vehicle 12 deviates from the corresponding sober driver profile 20 a predetermined amount. Accordingly, the system 10 is adaptive to the routines of the driver.

The challenge 14 is configured to determine if the driver is impaired. For example, the challenge 14 may be a verbal response, one challenge 14 selected from the group consisting of a mathematical problem, a repetition of a phrase, a physical act, a horizontal gaze nystagmus test, or a blood alcohol breathalyzer test. The challenge unit 28 may be configured to issue one or more challenges 14. The challenge unit 28 renders the motor vehicle 12 inoperable until the challenge 14 is passed. The challenge unit 28 may be further configured to wait a predetermined period before issuing a challenge 14 in the event the driver fails a challenge 14.

One of the challenges 14 may test the driver's speech. The system 10 may include a speech recognition unit. The speech recognition unit may include a microphone and an executable program configured to analyze the user's voice to detect a slur, or the user's response time. The speech recognition unit may be further configured to record and store a phrase spoken by the driver so as to generate a stored phrase. The stored phrase serves as a benchmark for the user's speech pattern when sober. In the event the impairment event unit 24 detects an impairment event 16, the challenge unit 28 requires the driver to repeat the stored phrase. The speech recognition unit compares the repeated phrase with the stored phrase. The challenge unit 28 renders the motor vehicle 12 inoperable when the repeated phrase deviates from the stored phrase a predetermined amount. For instance, the speech recognition unit may compare the length of time taken to repeat the phrase with the duration of the stored phrase, the presence of a lisp in the repeated phrase that was not present in the stored phrase, or the delay in repeating the stored phrase to determine that the response is unacceptable.

In another example of a challenge 14, the system 10 may analyze the gaze of the driver to determine if the driver is fit for operating the motor vehicle 12. The system 10 includes a camera. The camera may be mounted on the sun visor above the steering wheel. The camera is configured to detect the eyes of the driver so as to perform the horizontal gaze nystagmus test. The system 10 may issue instructions to the driver to perform the horizontal gaze nystagmus test.

The system 10 may be further configured to initiate a phone call in the event the driver cannot pass a challenge 14. The system 10 includes a calling unit. The calling unit may be configured to actuate the driver's phone so as to place a phone call to a predetermined phone number when the motor vehicle 12 is rendered inoperable. The challenge unit 28 may be configured to administer a predetermined number of challenges 14 before requesting the calling unit to initiate a phone call. The predetermined phone number is selected by the driver.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. A system for use in a motor vehicle, the system configured to administer an impairment evaluation, the system comprising:
    a database;
    a plurality of impairment events stored in the database, wherein each of the plurality of impairment events includes a geographic location of a place and a time period;
    an electronic control unit, the electronic control unit having a processor configured to process and read a computer executable instruction that, when executed, cause the electronic control unit to determine a sober driver profile, wherein the sober driver profile is determined during a predetermined period of time when any one of the plurality of impairment events is not detected, wherein a braking habit, speed and turning characteristic of the driver are recorded over the predetermined period of time to determine the sober driver profile; and
    a sensor assembly, the sensor assembly detecting a location and a current driving operation of the motor vehicle after a motor vehicle stop, the sensor assembly including a speedometer, an accelerometer, a steering wheel angle sensor and a brake pad sensor detecting speed, turning and braking force of the motor vehicle;
    wherein the electronic control unit also receives the current driving operation of the vehicle from the sensor assembly, compares the current driving operation of the vehicle with the sober driver profile after the motor vehicle stop, and identifies the location of the motor vehicle stop as a new impairment event and permanently stores the new impairment event in the database as one of the plurality of impairment events when the current driving operation of the vehicle deviates from the sober driver profile a predetermined amount, wherein the electronic control unit further associates the location of the motor vehicle stop within the new impairment event, and wherein every time the motor vehicle subsequently makes a stop at the location associated with the new impairment event, the electronic control unit administers a challenge to the driver after the impairment event so as to determine if the driver is impaired, wherein the electronic control unit renders the vehicle inoperable when the driver fails the challenge.

2. The system as set forth in claim 1, wherein the electronic control unit includes a calendar, the calendar identifying holidays and birthdays, wherein the electronic control unit processes the calendar and compares the current driving operation of the vehicle with the sober driver profile on each holiday and birthday so as to determine if a respective holiday or birthday is an impairment event.

3. The system as set forth in claim 2, wherein the electronic control unit determines whether the impairment event is a non-impairment event when the driver passes the challenge within a predetermined period of time.

4. The system as set forth in claim 3, wherein the electronic control unit administers the challenge only during a predetermined period of time.

5. The system as set forth in claim 4, wherein the electronic control unit associates the motor vehicle stop with a location of the motor vehicle, a time and day of the motor vehicle stop, a duration of the motor vehicle stop, and an occurrence of the motor vehicle stop so as to determine a stopping routine.

6. The system as set forth in claim 5, wherein the electronic control unit generates a plurality of driver profiles, each of the plurality of driver profiles corresponding to the motor vehicle stop in the stopping routine.

7. The system as set forth in claim 6, wherein the electronic control unit compares the current driving operation of the vehicle with a corresponding sober driver profile after an associated motor vehicle stop in the stopping routine, the electronic control unit identifying the associated motor vehicle stop in the stopping routine as the impairment event when the current driving operation of the vehicle deviates from the corresponding sober driver profile a predetermined amount.

8. The system as set forth in claim 7, wherein the electronic control unit administers at least one challenge.

9. The system as set forth in claim 7, wherein the challenge is one challenge selected from the group consisting of a mathematical problem, a repetition of a phrase, a physical act, a horizontal gaze nystagmus test, or a blood alcohol breathalyzer test.

10. The system as set forth in claim 9, wherein the electronic control unit records and stores a phrase spoken by the driver so as to generate a stored phrase, wherein the electronic control unit requires the driver to repeat the phrase and the electronic control unit compares the repeated phrase with the stored phrase, wherein the electronic control unit renders the motor vehicle inoperable when the repeated phrase deviates from the stored phrase a predetermined amount.

11. The system as set forth in claim 9, further including a camera, the camera configured to detect the eyes of the driver so as to perform the horizontal gaze nystagmus test.

12. The system as set forth in claim 1, wherein the electronic control unit makes a phone call to a predetermined phone number when the vehicle is rendered inoperable.

13. The system as set forth in claim 12, wherein the predetermined phone number is selected by the driver.

\* \* \* \* \*